(12) United States Patent
Julian et al.

(10) Patent No.: US 11,485,037 B2
(45) Date of Patent: Nov. 1, 2022

(54) VEGETABLE KNIFE HAVING A PULVERIZING CORING PIN

(71) Applicant: Lamb Weston, Inc., Eagle, ID (US)

(72) Inventors: John Julian, Richland, WA (US); Mark A. Fow, Kennewick, WA (US); Samuel Monk, Richland, WA (US); Christopher M. Smith, Richland, WA (US)

(73) Assignee: Lamb Weston, Inc., Eagle, ID (US)

( * ) Notice: Subject to any disclaimer, the term of this patent is extended or adjusted under 35 U.S.C. 154(b) by 0 days.

(21) Appl. No.: 16/188,167

(22) Filed: Nov. 12, 2018

(65) Prior Publication Data

US 2020/0147824 A1 May 14, 2020

(51) Int. Cl.
*B26D 7/27* (2006.01)
*B26D 1/00* (2006.01)
(Continued)

(52) U.S. Cl.
CPC ............... *B26D 7/27* (2013.01); *B02C 18/18* (2013.01); *B02C 18/2216* (2013.01);
(Continued)

(58) Field of Classification Search
CPC ...... B26D 3/11; B26D 1/0006; Y10T 83/9394
See application file for complete search history.

(56) References Cited

U.S. PATENT DOCUMENTS

| 174,422 A | * | 3/1876 | Taylor | B44B 5/0014 |
| | | | | 101/7 |
| 427,056 A | * | 5/1890 | dawson | A47J 25/00 |
| | | | | 30/113.3 |

(Continued)

FOREIGN PATENT DOCUMENTS

| CA | 2080789 A1 | 4/1993 |
| CN | 106061272 A | 10/2006 |

(Continued)

OTHER PUBLICATIONS

Notification of Transmittal of the International Search Report and the Written Opinion of the International Searching Authority for App. No. PCT/US2019/060831 dated Mar. 12, 2020.

(Continued)

*Primary Examiner* — Evan H MacFarlane
*Assistant Examiner* — Fernando A Ayala
(74) *Attorney, Agent, or Firm* — Ryan T. Grace; Advent, LLP

(57) ABSTRACT

A vegetable knife includes a pulverizing coring pin for pulverizing a core of a vegetable, where the pulverizing coring pin can be a generally cylindrical tube. The pulverizing coring pin can define one or more pulverizing tubes that extend from a first end of the pulverizing coring pin to a second end of the pulverizing coring pin opposite the first end. The vegetable knife also includes at least one vegetable shaping blade that extends radially outwardly from the pulverizing coring pin, where the at least one vegetable shaping blade supports the pulverizing coring pin at a location generally central with respect to the vegetable knife. The vegetable knife may also include an outer flange for coupling the vegetable knife to a rotatable cutting assembly. The vegetable shaping blade can be connected between the outer flange and the pulverizing coring pin for supporting the pulverizing coring pin.

17 Claims, 15 Drawing Sheets

(51) Int. Cl.
    *B26D 3/11*     (2006.01)
    *B02C 18/18*     (2006.01)
    *B02C 18/22*     (2006.01)
    *B26D 7/26*     (2006.01)

(52) U.S. Cl.
    CPC .............. *B26D 1/0006* (2013.01); *B26D 3/11* (2013.01); *B26D 7/2614* (2013.01); *B26D 2001/006* (2013.01); *B26D 2210/02* (2013.01)

(56) References Cited

U.S. PATENT DOCUMENTS

| | | | | |
|---|---|---|---|---|
| 535,333 A * | 3/1895 | hall | | A47J 25/00 30/113.3 |
| 1,408,051 A * | 2/1922 | Whittam | | B26D 3/26 30/302 |
| 1,422,066 A * | 7/1922 | Vafiades | | A47J 25/00 30/113.3 |
| 1,530,822 A * | 3/1925 | Gibson | | A47J 25/00 30/279.2 |
| 1,605,677 A * | 11/1926 | McCarthy | | A47J 25/00 99/544 |
| 1,622,874 A * | 3/1927 | Kovats | | A47J 25/00 30/113.2 |
| 1,638,798 A * | 8/1927 | Cooney | | A47J 25/00 100/94 |
| 2,188,362 A * | 1/1940 | Krilow | | A47J 25/00 30/113.3 |
| 2,683,312 A * | 7/1954 | Dover | | A47J 25/00 30/302 |
| 4,387,111 A | 6/1983 | Mullender | | |
| 4,479,614 A | 10/1984 | Bernard | | |
| 4,560,337 A * | 12/1985 | Chin | | A23P 30/20 425/288 |
| 4,690,047 A * | 9/1987 | Balzano | | A47J 25/00 30/128 |
| 5,067,397 A * | 11/1991 | Healy | | A23N 4/20 99/542 |
| 5,167,177 A | 12/1992 | Cimperman | | |
| 5,167,178 A | 12/1992 | Cimperman et al. | | |
| 5,228,397 A * | 7/1993 | Plant | | A23N 7/026 99/544 |
| 5,293,803 A * | 3/1994 | Foster | | B26D 1/0006 83/356.3 |
| 5,331,887 A * | 7/1994 | Beck | | A23N 1/003 100/105 |
| 5,385,074 A | 1/1995 | Burch, Jr. | | |
| 5,873,676 A * | 2/1999 | Brown | | E21B 7/20 175/53 |
| 5,992,287 A | 11/1999 | Dube | | |
| 6,032,368 A * | 3/2000 | Huang | | A47J 25/00 30/113.1 |
| D568,119 S * | 5/2008 | Horton | | D7/682 |
| D702,512 S * | 4/2014 | Harris | | D7/673 |
| 2005/0066824 A1 * | 3/2005 | Brown | | A47J 25/00 99/547 |
| 2008/0128076 A1 * | 6/2008 | Nimura | | B29B 17/02 156/247 |
| 2009/0211461 A1 * | 8/2009 | Berger | | A23P 20/25 99/538 |
| 2009/0266246 A1 * | 10/2009 | Hood | | A47J 25/00 99/565 |
| 2012/0012687 A1 * | 1/2012 | Vierstra | | B02C 23/10 241/79 |
| 2016/0046031 A1 | 2/2016 | Rogers et al. | | |
| 2018/0055086 A1 * | 3/2018 | Cizio | | A23P 30/20 |

FOREIGN PATENT DOCUMENTS

| | | |
|---|---|---|
| CN | 101048066 A | 10/2007 |
| CN | 101347758 A | 1/2009 |

OTHER PUBLICATIONS

First Office Action for Chinese Application No. 201980074255.3, dated Jun. 6, 2022.

* cited by examiner

VEGETABLE KNIFE HAVING A PULVERIZING CORING PIN

BACKGROUND

An increasing number of food products are processed before arriving on a consumer's plate. A variety of fruits and vegetables, for example, can be cut or shaped and then frozen or otherwise preserved for later use. To meet the demand for processed food products and efficiently produce large quantities of such products, the food industry utilizes various equipment for rapidly processing the same.

DRAWINGS

The Detailed Description is described with reference to the accompanying figures.

DETAILED DESCRIPTION

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. Among other things, the features of the disclosure can be embodied as processes, processes for making food products, equipment, and food products. The following detailed description is, therefore, not to be taken in a limiting sense.

Figure 1:
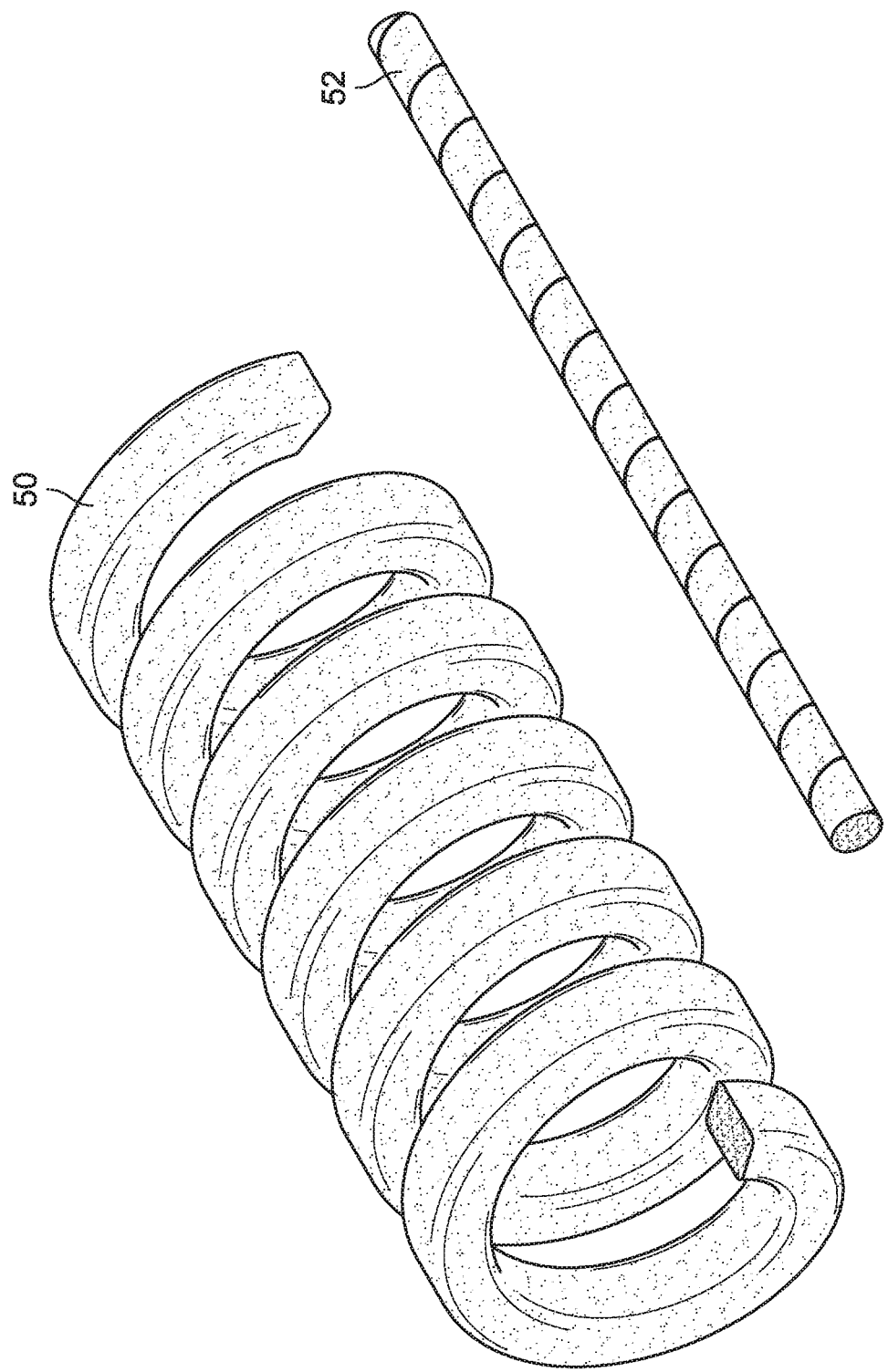
FIG. 1 is an isometric view illustrating a cut vegetable product and a plug core removed from the cut vegetable product.

A vegetable knife can cut vegetables (e.g., potatoes, sweet potatoes) into various shapes for further processing, for packaging, and/or for consumption. For example, with reference to FIG. 1, a vegetable knife can be used in a vegetable processing plant to process a vegetable and produce a generally helical, cut vegetable product 50. In the process of cutting the vegetable product 50 from the vegetable, waste product in the form of a plug core 52 is also generated. After the vegetable product 50 has been cut, the plug core 52 remains generally within the vegetable product 50. Then, the plug core 52 is disentangled from the vegetable product 50 and discarded or further processed. Disentanglement of the plug core 52 to form the arrangement shown in FIG. 1 results in lost processing efficiencies in the plant. For instance, disentanglement without damaging the vegetable product 50, which is generally in a raw or partially processed and fragile state, is typically very difficult. This difficulty may be compounded when multiple, interleaved vegetable products (e.g., in the form of multiple helically cut vegetable products) are produced from a single vegetable.

Figure 2:
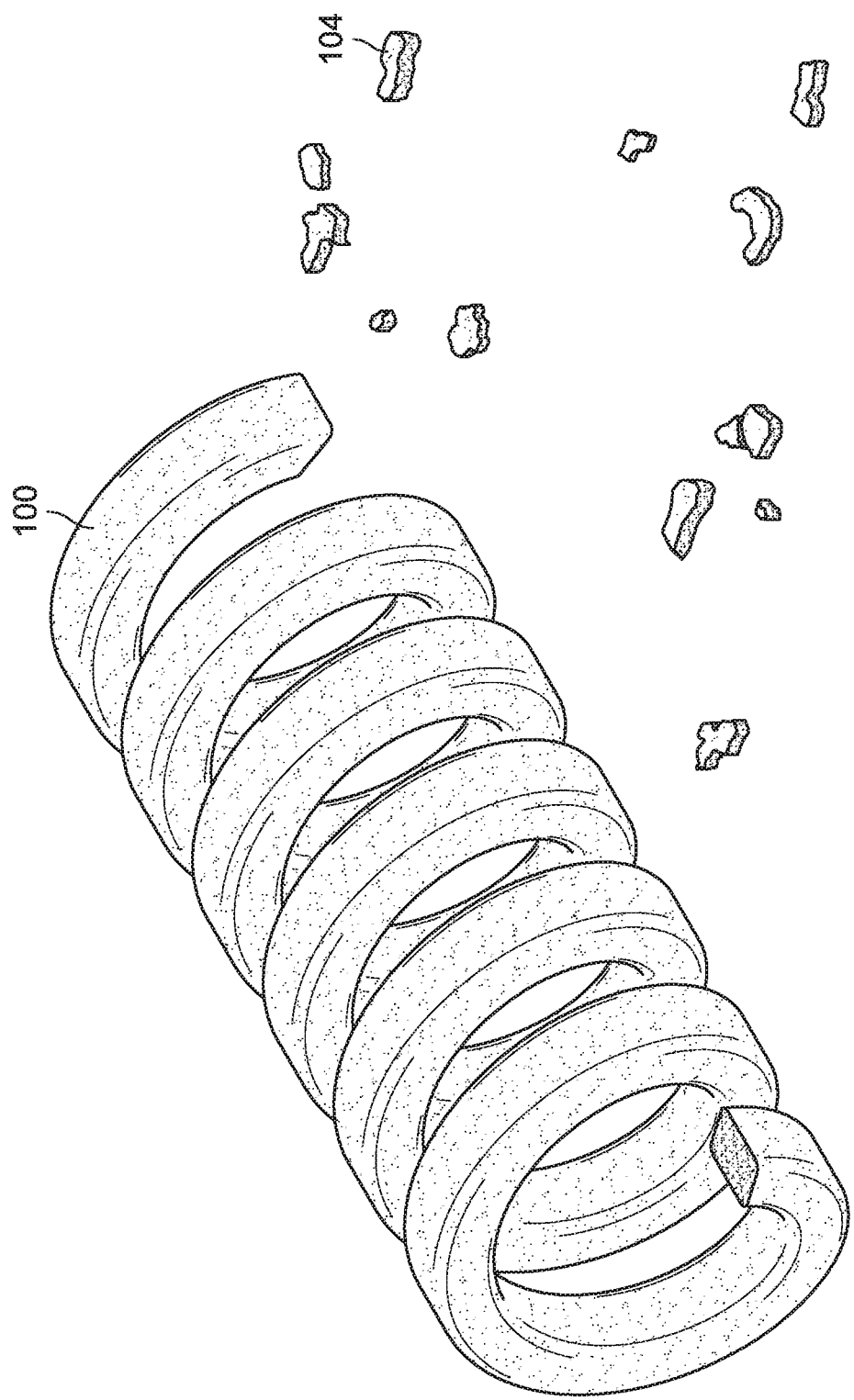
FIG. 2 is an isometric view illustrating a cut vegetable product and a pulverized core removed from the cut vegetable product in accordance with example embodiments of the present disclosure.

Referring now to FIGS. 2 through 15, vegetable knives 110 are described in accordance with example embodiments of the present disclosure. A vegetable knife 110 has a pulverizing coring pin 116 for pulverizing a core 104 of a vegetable 108 (FIG. 3) to produce one or more cut vegetable products 100. For example, the vegetable knife 110 can be used to produce a single helically cut vegetable product 100, multiple helically cut vegetable products 100, and so forth. For example, as shown in FIG. 2, a pulverized core 104 is produced by a vegetable knife 110 having a pulverizing coring pin 116. Thus, example vegetable knives 110 as described herein may not require disentanglement of core pieces, as the core pieces have been reduced in size and may be easily removed (e.g., flushed, rinsed) from the vegetable products 100.

Figure 3:
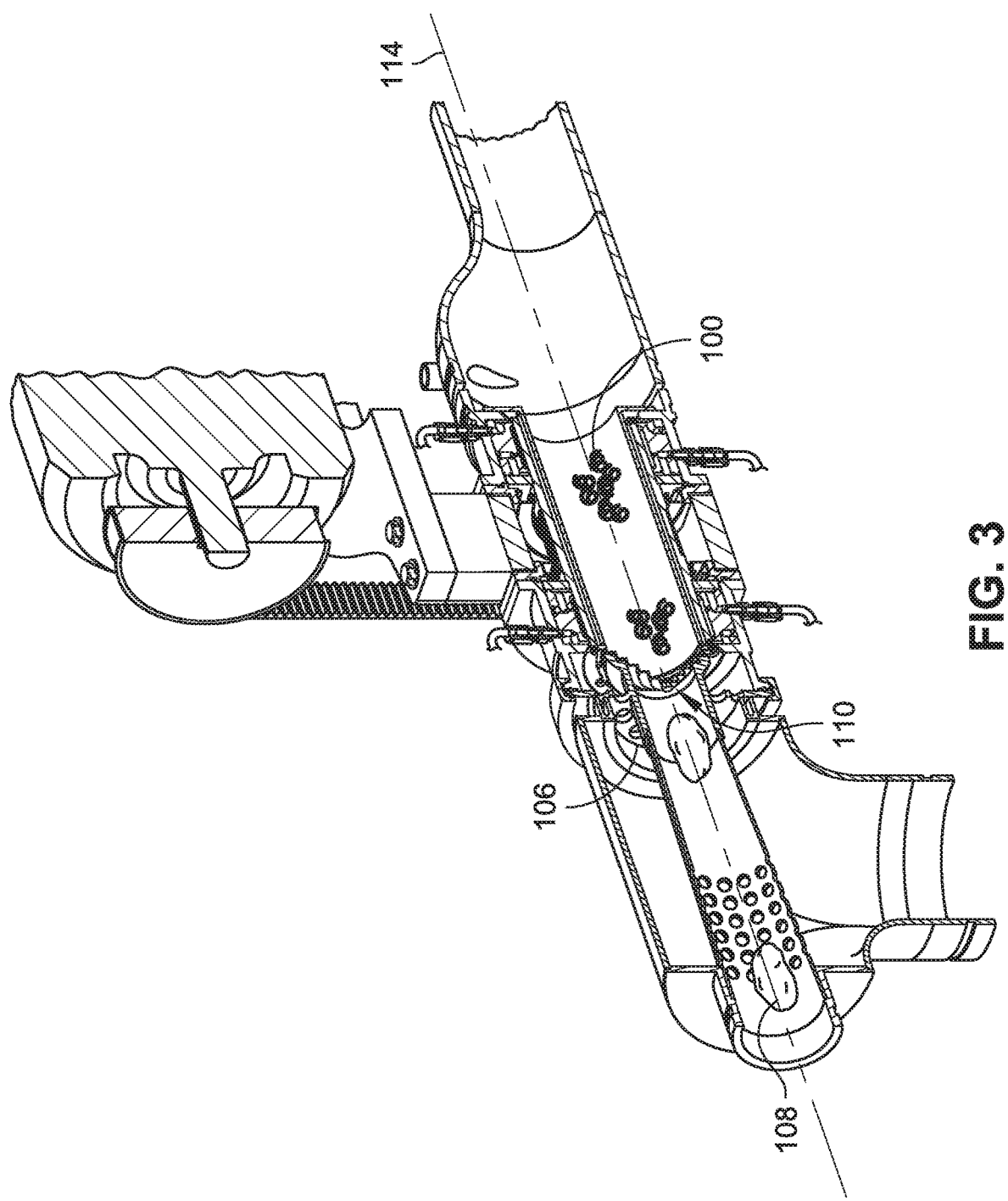
FIG. 3 is a partial cross-sectional isometric view illustrating manufacturing equipment with a rotatable cutting assembly that includes a vegetable knife for producing a cut vegetable product with a pulverized core, such as the cut vegetable product with the pulverized core illustrated in FIG. 2, in accordance with example embodiments of the present disclosure.

Referring now to FIG. 3, an example manufacturing system including a rotatable cutting assembly 106 for rotating a vegetable knife 110 to produce cut vegetable products 100 from vegetables 108 is shown. The rotatable cutting assembly 106 rotates about a rotational axis 114 that is generally aligned with a processing path of the vegetables 108. It should be noted that the example manufacturing equipment shown and described with reference to FIG. 3 is merely one environment for the vegetable knives 110 described herein. The components associated with the example manufacturing system of FIG. 3 can be combined in different ways to produce cuts using a rotatable cutting assembly 106.

Further, although FIG. 3 depicts a vegetable 108 in the form of a potato, the disclosure herein shall be understood to include all vegetables and shall not be limited to potatoes. A few examples of other vegetables include sweet potatoes, yams, beets, and carrots. In addition, the term "vegetable" shall be understood to includes fruits having a flesh density suitable for cutting by a vegetable knife 110. For example, apples, pears, and pineapples are several fruits that may be cut and/or processed by a vegetable knife 110. In some embodiments, a vegetable 108 may be chilled, heated, and/or otherwise subjected to one or more pre-processing steps to provide an appropriate hardness, softness, and/or density for subsequent cutting by a vegetable knife 110.

Referring to FIGS. 4 through 15, the pulverizing coring pin 116 of the vegetable knife 110 can be a generally cylindrical tube. However, a cylindrical tube is provided by way of example and is not meant to limit the present disclosure. In other embodiments, the pulverizing coring pin 116 may be shaped differently (e.g., square-shaped, rectangular-shaped, hexagonally-shaped, octagonally-shaped, and so forth). The vegetable knife 110 also includes at least one vegetable shaping blade 118 for shaping the vegetable 108, where the vegetable shaping blade 118 extends radially outwardly from the pulverizing coring pin 116. In embodiments, the vegetable shaping blade 118 supports the pulverizing coring pin 116 at a location generally central with respect to the vegetable knife 110.

The vegetable knife 110 may also include one or more outer flanges 112 for coupling the vegetable knife 110 to a rotatable cutting assembly (e.g., the rotatable cutting assembly 106 described with reference to FIG. 3). In some embodiments, the vegetable shaping blade 118 is connected between an outer flange 112 and the pulverizing coring pin 116 for supporting the pulverizing coring pin 116 at a location generally central with respect to the outer flange 112 and generally coaxial with the rotational axis 114 of the rotatable cutting assembly 106, i.e., an axial extension of the coring pin coincides with the rotational axis 114. In some embodiments, the outer flange 112 can define one or more apertures 120 for coupling the vegetable knife 110 to the rotatable cutting assembly 106. For example, fasteners such as screws, bolts, and so on may be used to mount the vegetable knife 110 to a rotatable cutting assembly 106.

Figure 7:
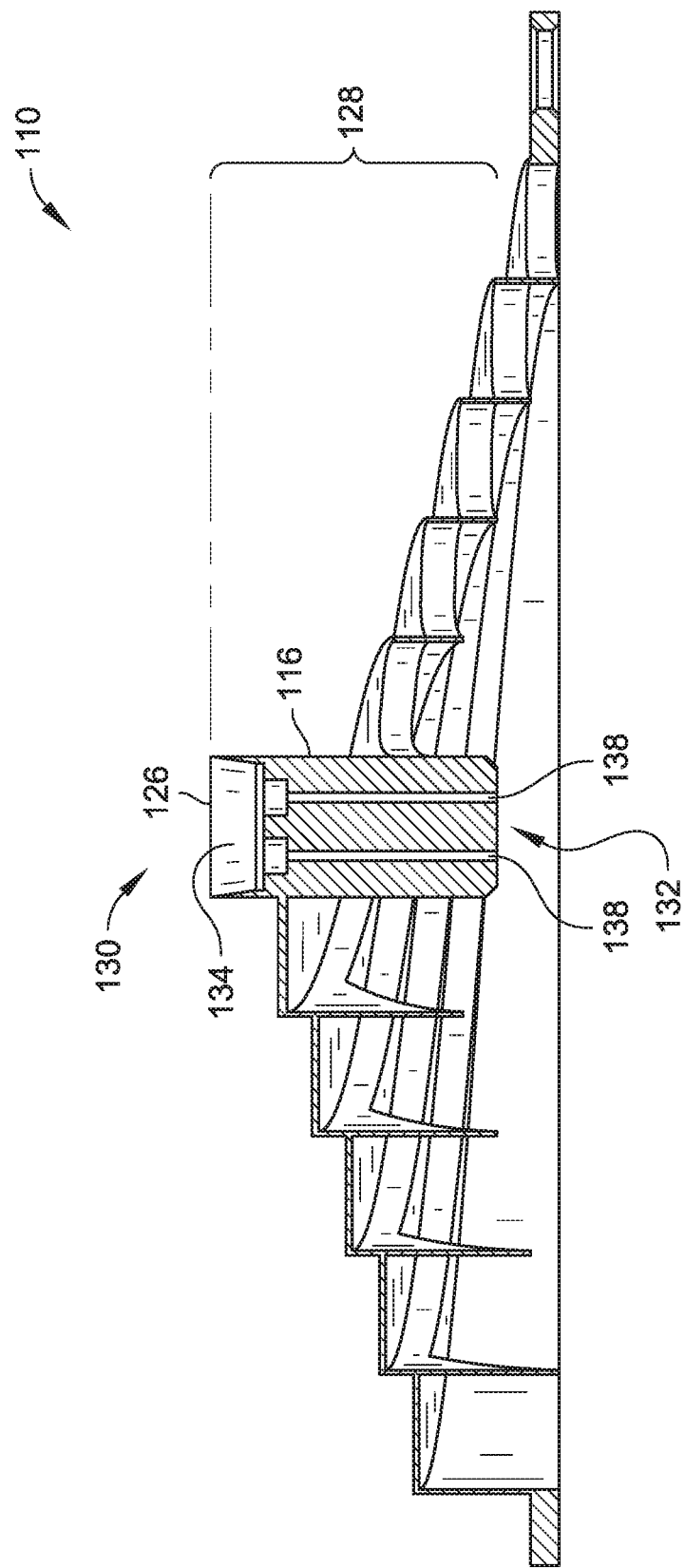
FIG. 7 is a cross-sectional elevation view of the vegetable knife illustrated in FIG. 4, taken on the line 7-7 in FIG. 4.
Figure 8:
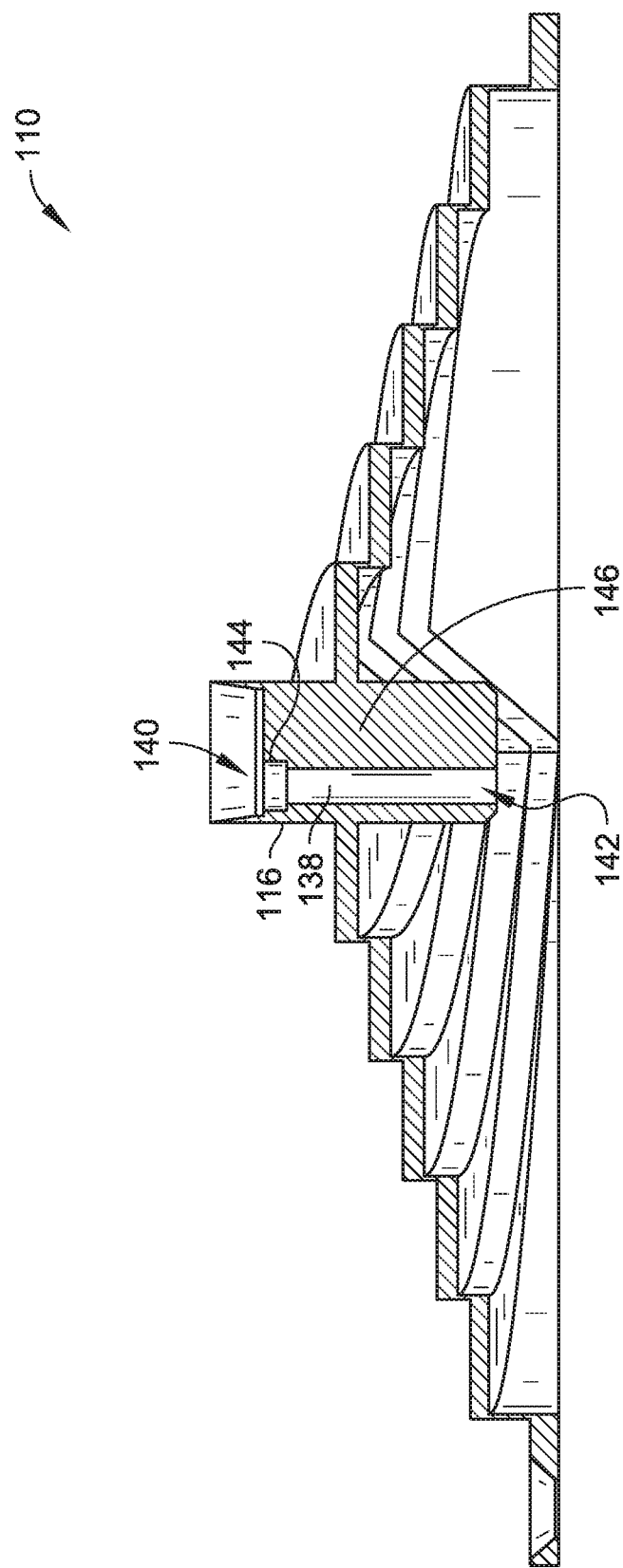
FIG. 8 is another cross-sectional elevation view of the vegetable knife illustrated in FIG. 4, taken on the line 8-8 in FIG. 4.

With reference to FIGS. 7 and 8, the tube of the pulverizing coring pin 116 can extend from a first side 130 of the vegetable knife 110 to a second side 132 of the vegetable knife 110 opposite the first side 130 (e.g., having a depth 128). The pulverizing coring pin 116 may include a blade edge 122 (FIG. 4) that extends around a circumference 126 of the tube of the pulverizing coring pin 116 at the first side 130 of the vegetable knife 110. In this manner, the pulverizing coring pin 116 defines a cutting volume 134 at a first end 140 of the pulverizing coring pin 116. The pulverizing coring pin 116 can also define one or more pulverizing tubes 138 (e.g., pulverizing microtubes) that extend from the first end 140 of the pulverizing coring pin 116 (e.g., proximate to the cutting volume 134) to a second end 142 of the pulverizing coring pin 116 opposite the first end 140. The pulverizing tubes 138 are configured to destroy (e.g., form into powder) or pulverize (e.g., form into smaller pieces) the core 104 of the vegetable 108.

In some embodiments, a pulverizing tube 138 has different diameters along its length. For example, as shown, a pulverizing tube 138 may have a first diameter 144 proximate to the first end 140 of the pulverizing coring pin 116 and a second diameter 146 proximate to the second end 142 of the pulverizing coring pin 116. The pulverizing tube 138 may have a sharp transition (e.g., right angles) between the section of the pulverizing tube 138 with the first diameter 144 and the section of the pulverizing tube 138 with the second diameter 146. It should be noted that a sharp transition between the first diameter 144 and the second diameter 146 is provided by way of example and is not meant to limit the present disclosure. In other embodiments, the transition between the first diameter 144 and the second diameter 146 may be angled, tapered, and so forth. Further, it should be noted that while three pulverizing tubes 138 are shown in the accompanying figures, more (e.g., four, five) or less (e.g., two, one) pulverizing tube 138 may be included with a pulverizing coring pin 116. Further, different tubes may have different diameters, different numbers of transitions between diameters with the same tube, and so forth.

Figure 4:
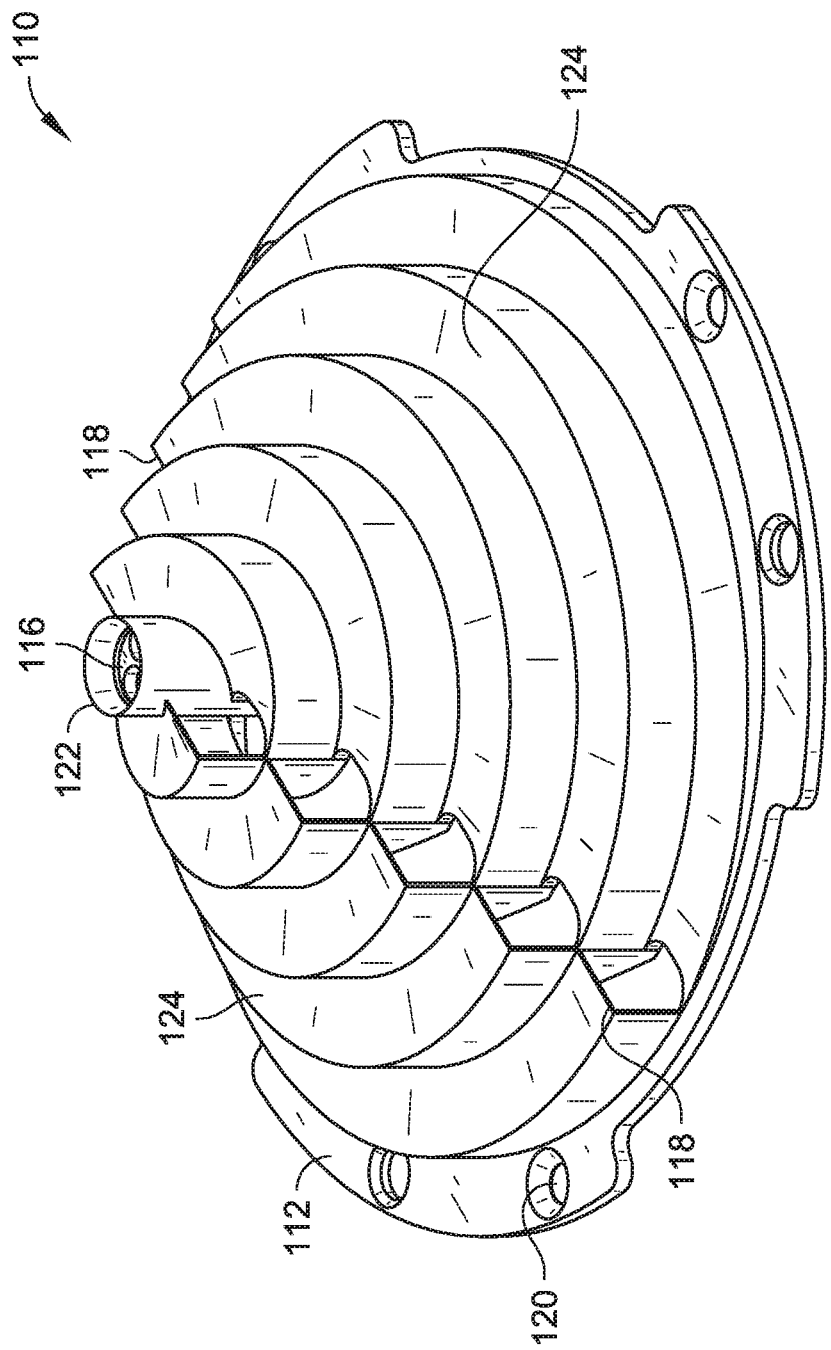
FIG. 4 is an isometric view illustrating a vegetable knife for producing a cut vegetable product with a pulverized core in accordance with an example embodiment of the present disclosure.
Figure 5:
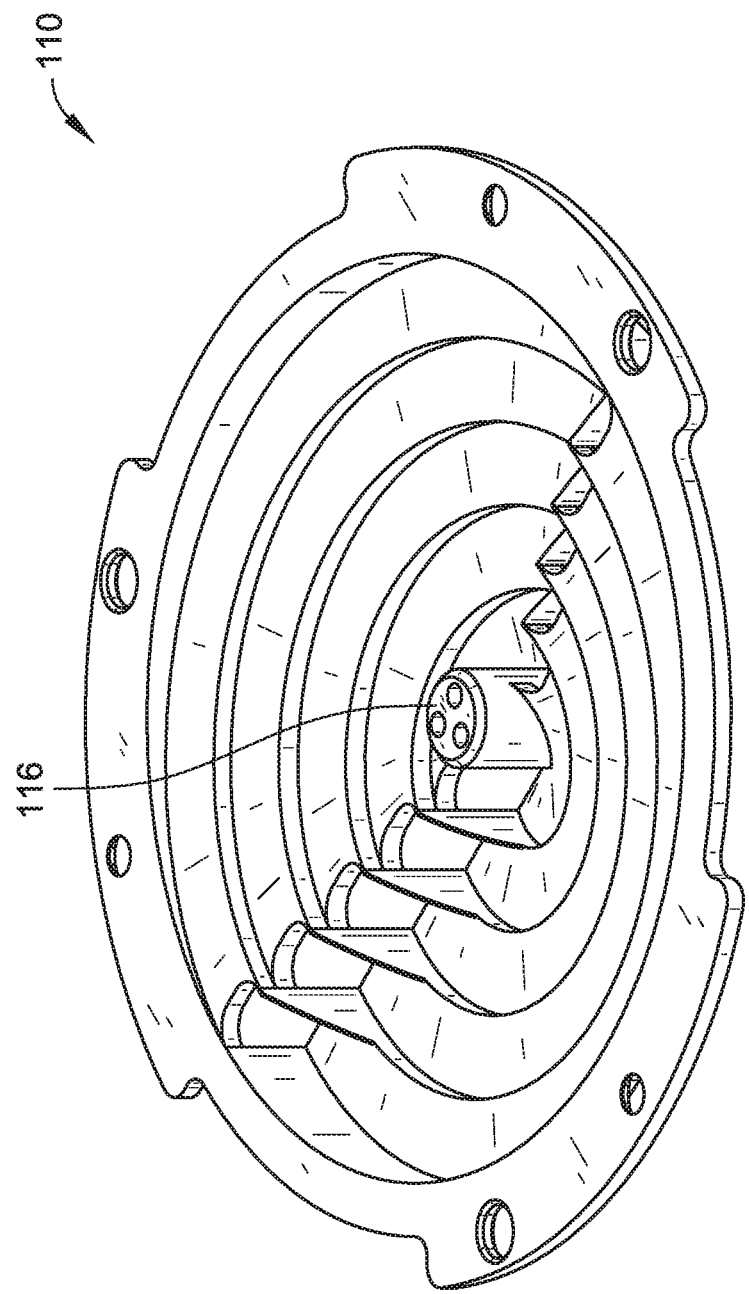
FIG. 5 is another isometric view of the vegetable knife illustrated in FIG. 4.
Figure 6:
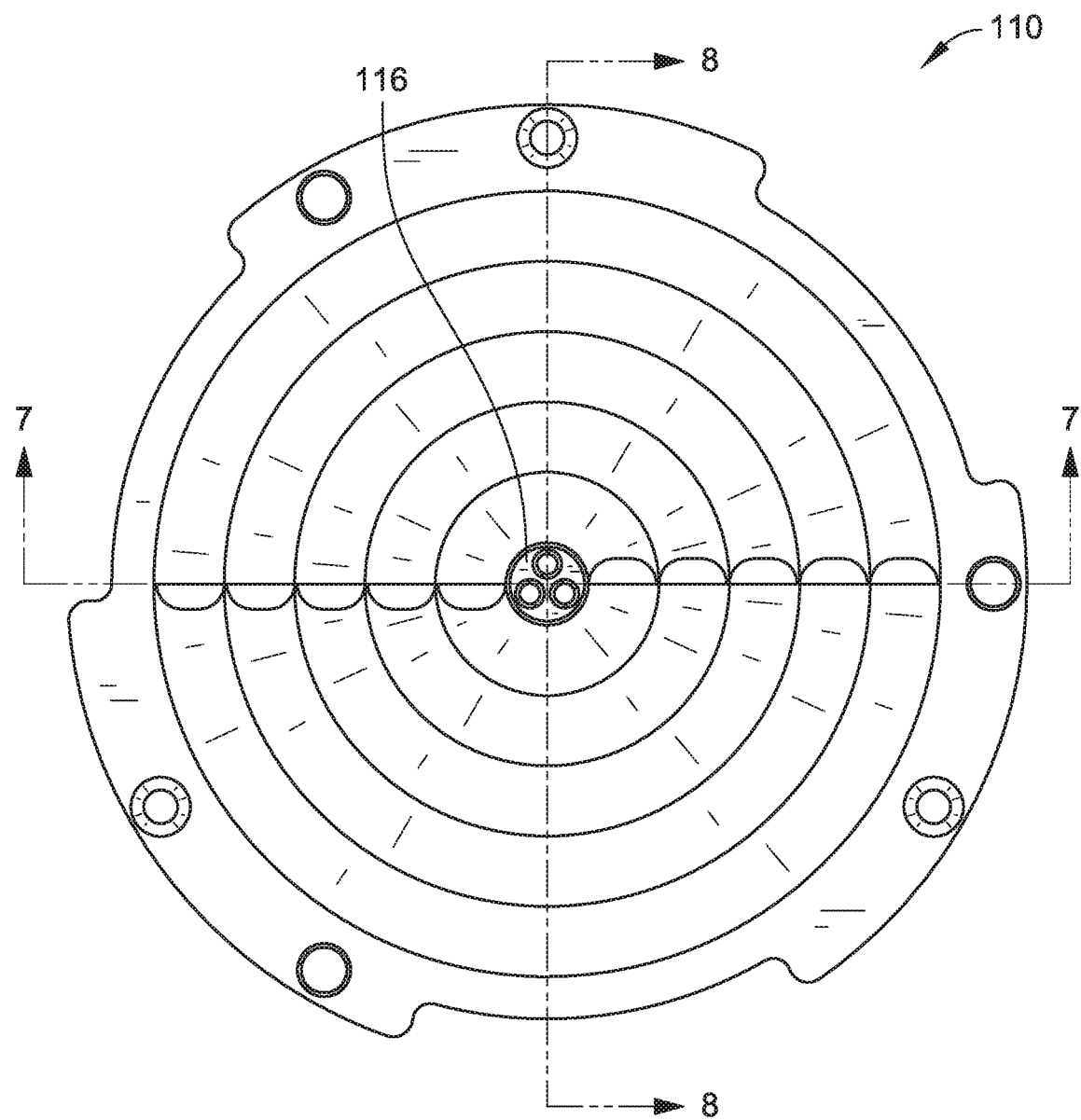
FIG. 6 is a top plan view of the vegetable knife illustrated in FIG. 4.
Figure 9:
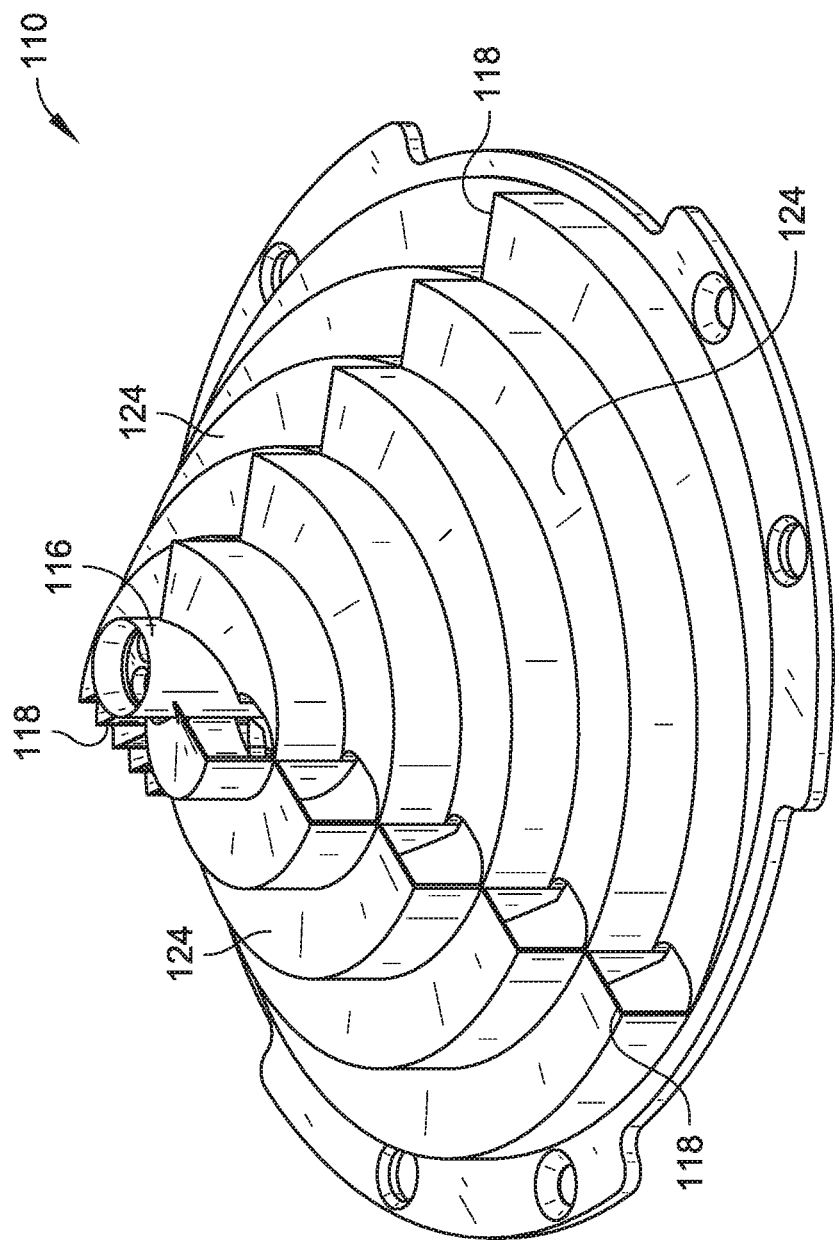
FIG. 9 is an isometric view illustrating another vegetable knife for producing a cut vegetable product with a pulverized core in accordance with an example embodiment of the present disclosure.
Figure 10:
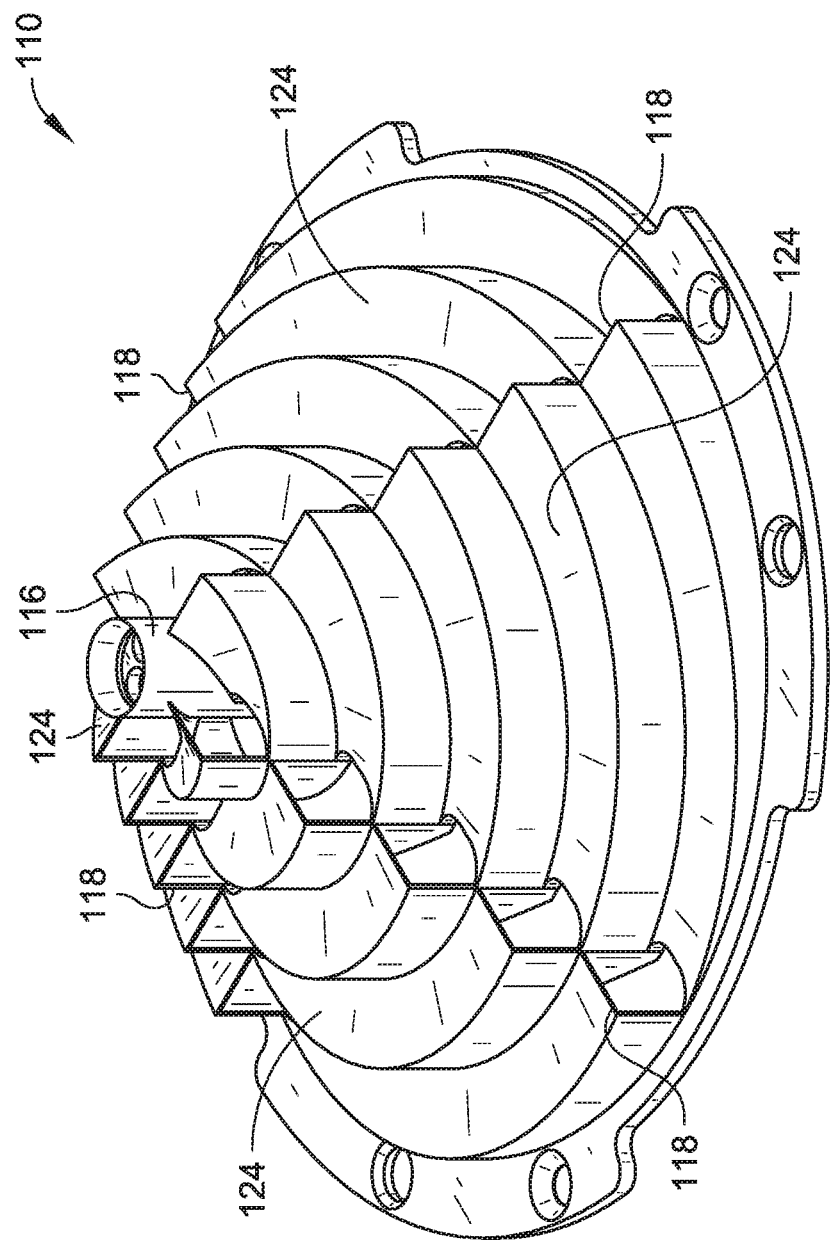
FIG. 10 is an isometric view illustrating a further vegetable knife for producing a cut vegetable product with a pulverized core in accordance with an example embodiment of the present disclosure.
Figure 11:
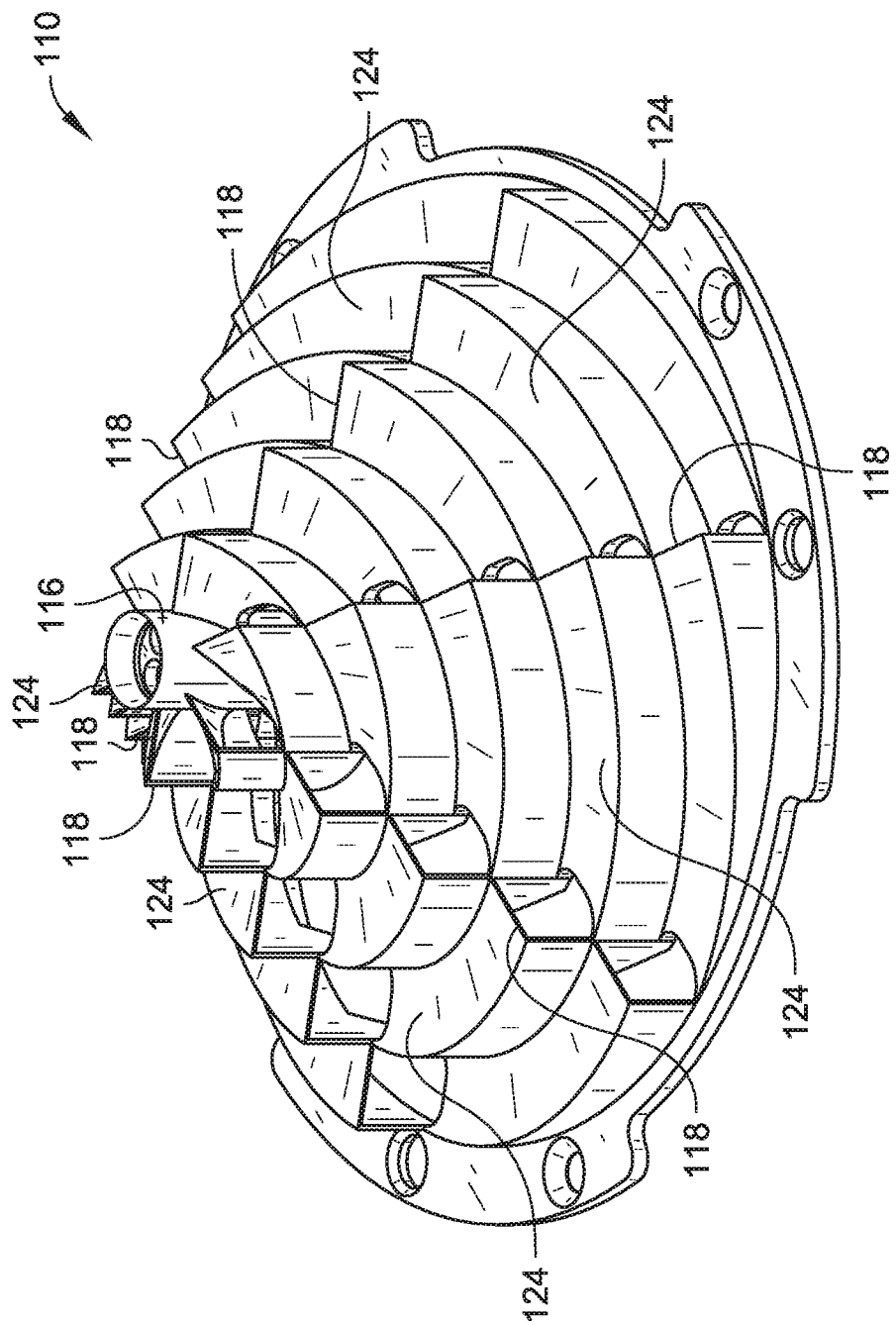
FIG. 11 is an isometric view illustrating a vegetable knife for producing a cut vegetable product with a pulverized core in accordance with an example embodiment of the present disclosure.
Figure 12:
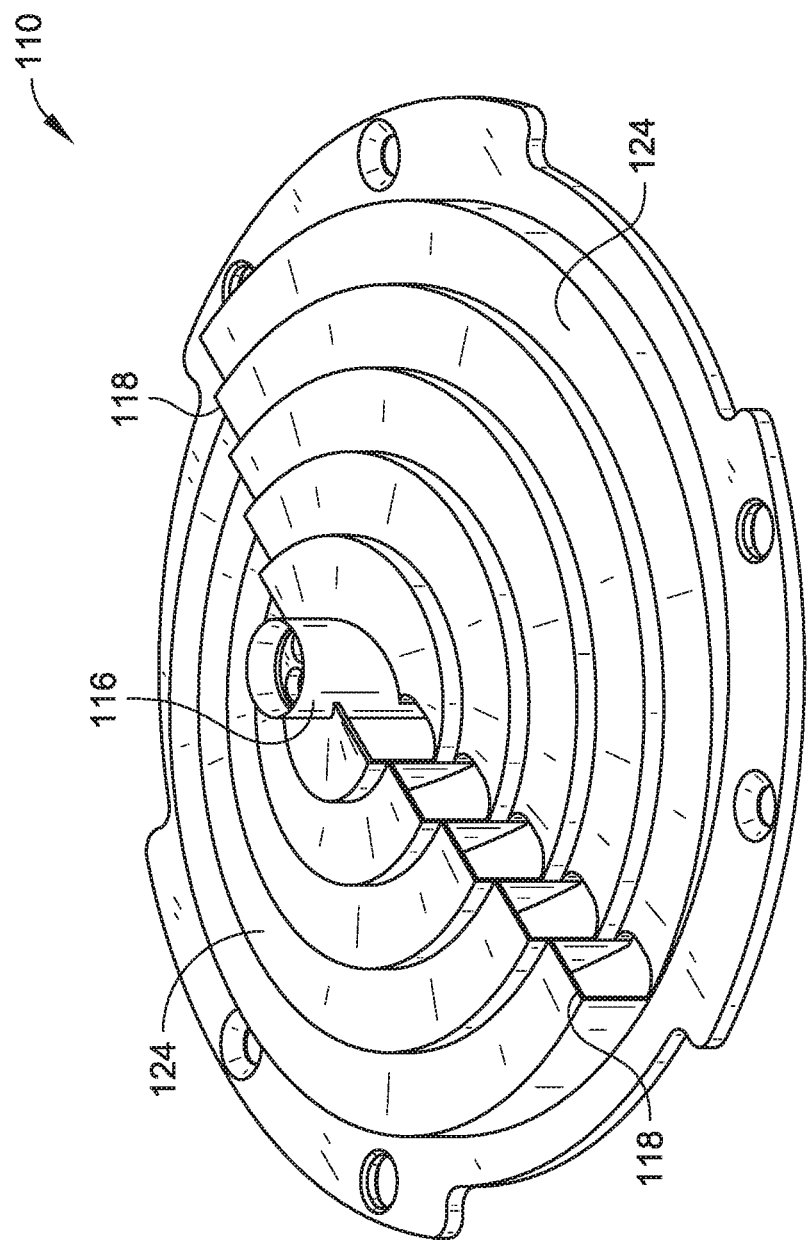
FIG. 12 is an isometric view illustrating another vegetable knife for producing a cut vegetable product with a pulverized core in accordance with an example embodiment of the present disclosure.
Figure 13:
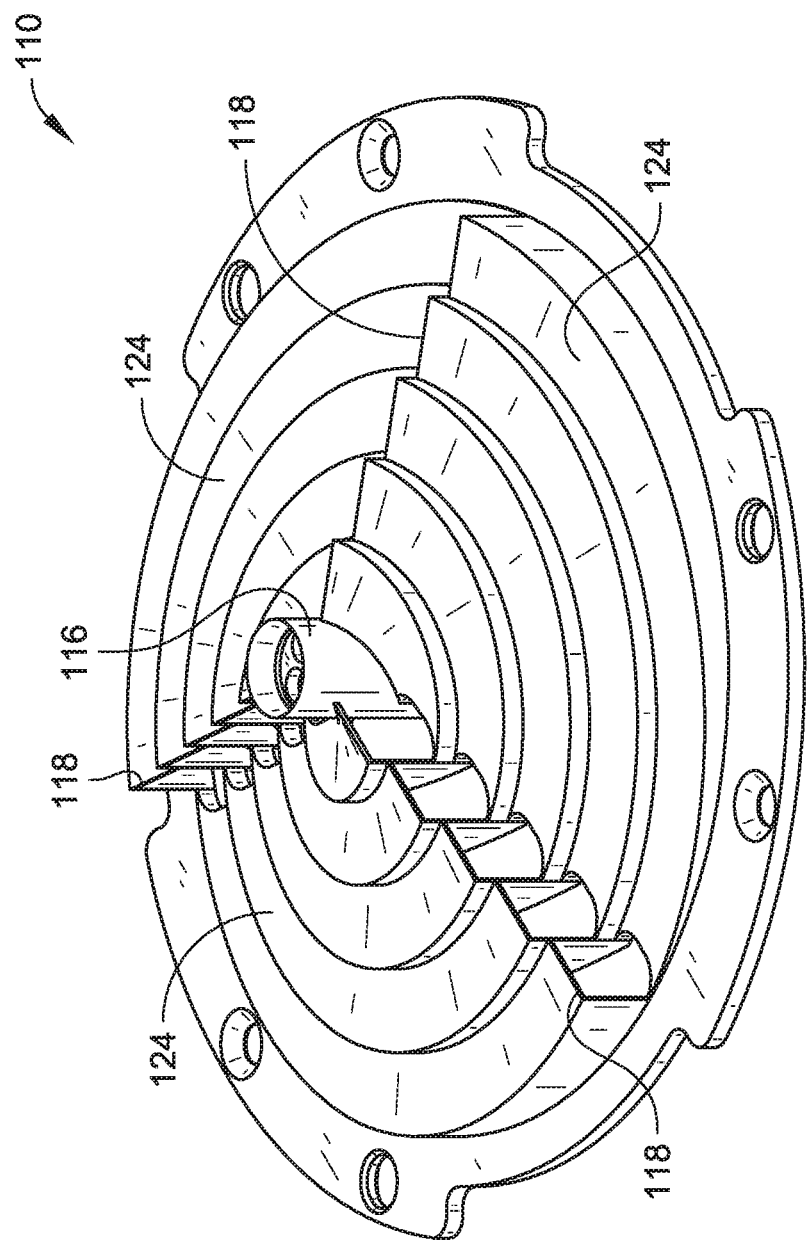
FIG. 13 is an isometric view illustrating a further vegetable knife for producing a cut vegetable product with a pulverized core in accordance with an example embodiment of the present disclosure.
Figure 14:
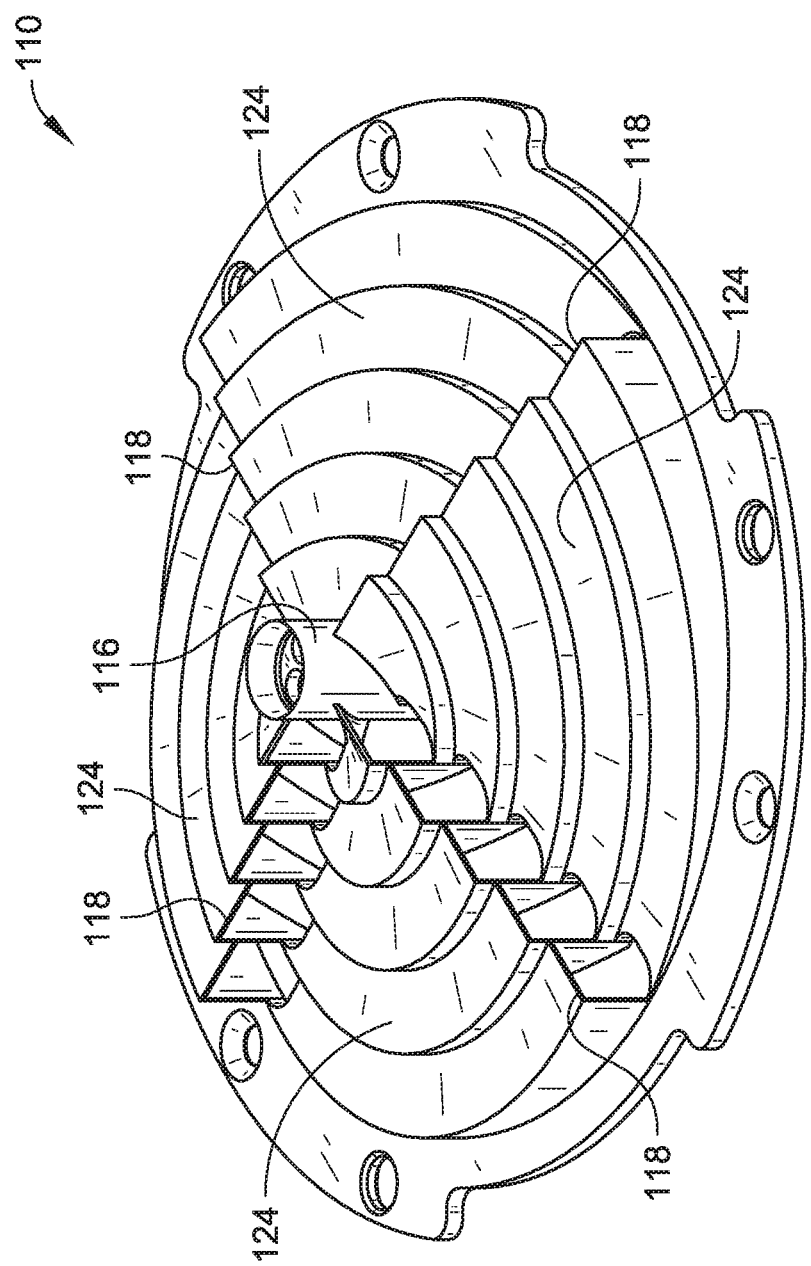
FIG. 14 is an isometric view illustrating a vegetable knife for producing a cut vegetable product with a pulverized core in accordance with an example embodiment of the present disclosure.
Figure 15:
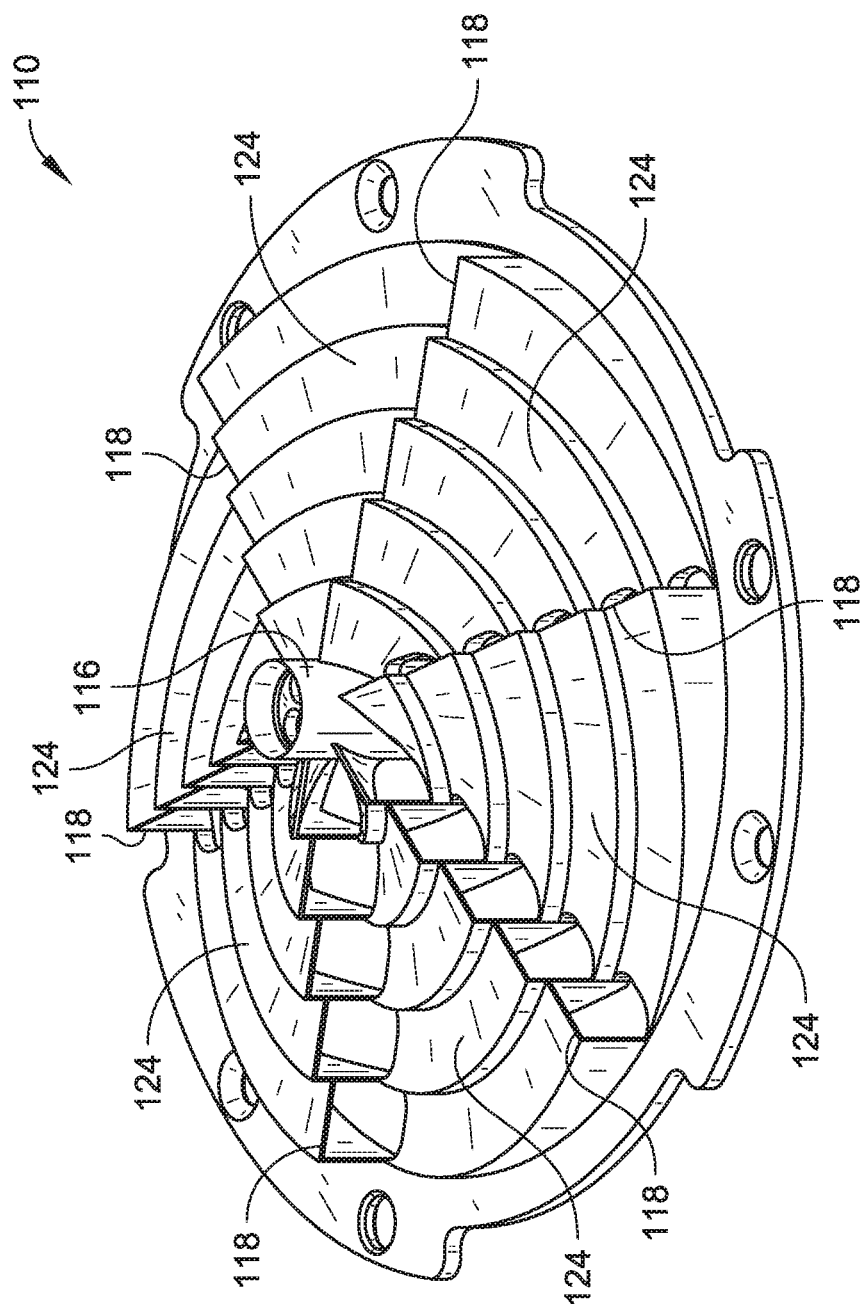
FIG. 15 is an isometric view illustrating another vegetable knife for producing a cut vegetable product with a pulverized core in accordance with an example embodiment of the present disclosure.

Referring to FIGS. 4 and 9 through 15, a vegetable knife 110 may have different numbers of knife sections 124 comprising stepped blades that extend radially outwardly and downwardly from the pulverizing coring pin 116 to the outer flange 112. For example, a vegetable knife 110 may have two knife sections 124 (e.g., arranged about 180 degrees apart, as shown in FIGS. 4 and 12), three knife sections 124 (e.g., arranged about 120 degrees apart, as shown in FIGS. 9 and 13), four knife sections 124 (e.g., arranged about 90 degrees apart, as shown in FIGS. 10 and 14), six knife sections 124 (e.g., arranged about 60 degrees apart, as shown FIGS. 11 and 15), and so forth. Each one of these different knife arrangements may produce different numbers of interleaved, generally helical, cut vegetable products 100. For example, the vegetable knives 110 shown in FIGS. 4 and 12 may produce two interleaved, generally helical cut vegetable products 100, while the vegetable knives 110 shown in FIGS. 5 and 13 may produce three interleaved, generally helical cut vegetable products 100, the vegetable knives 110 shown in FIGS. 6 and 14 may produce four interleaved, generally helical cut vegetable products 100, and the vegetable knives 110 shown in FIGS. 7 and 15 may produce six interleaved, generally helical cut vegetable products 100. Further, different number of knife sections 124 may be provided (e.g., more than six knife sections, such as seven knife sections, less than two knife sections, such as one knife section, and so forth).

In embodiments of the disclosure, the knife sections 124 shown in FIGS. 4 through 15 are radially balanced. For example, multiple knife sections 124 are arranged at regular intervals from one another (e.g., generally spaced an equal number of degrees apart). It should also be noted that vegetable knives 110 may have different pitches. For example, the knives shown in FIGS. 4 through 11 may be conically shaped, having a steeper pitch than the knives shown in FIGS. 12 through 15. The pitch of the knives shown in FIGS. 12 through 15 may range from about five (5) degrees to about 15 degrees, while the knives shown in FIGS. 4 through 11 may have a pitch may have a pitch ranging from about 20 degrees to about 40 degrees. However, these ranges are provided by way of example and are not meant to limit the present disclosure. In other embodiments a vegetable knife 110 may have knife sections 124 having different pitches. It should also be noted that stepped blades are provided by way of example. In other embodiments, one or more knife sections 124 can have different blade arrangements, including, but not necessarily limited to: straight-edged blades, scalloped-edged blades, wave-shaped blades, star-shaped blades, and so forth.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A vegetable knife comprising:
    an outer flange for coupling the vegetable knife to a rotatable cutting assembly;
    a pulverizing coring pin for pulverizing a core of a vegetable, the pulverizing coring pin having an axial extension that extends axially from a first side of the vegetable knife to a second side of the vegetable knife and having a plurality of pulverizing tubes within the pulverizing coring pin, the plurality of pulverizing tubes extending from a first end of the pulverizing coring pin to a second end of the pulverizing coring pin opposite the first end, the plurality of pulverizing tubes extending in a direction of the axial extension of the pulverizing coring pin with respect to the vegetable knife; and
    at least one vegetable shaping blade extending radially outwardly from the pulverizing coring pin for shaping the vegetable, the at least one vegetable shaping blade connected between the outer flange and the pulverizing coring pin for supporting the pulverizing coring pin at a central portion of the vegetable knife with respect to the outer flange.

2. The vegetable knife as recited in claim 1, wherein the outer flange includes at least one aperture for coupling the vegetable knife to the rotatable cutting assembly.

3. The vegetable knife as recited in claim 1, wherein the pulverizing coring pin comprises a cylindrical tube extending from a first side of the vegetable knife to a second side of the vegetable knife opposite the first side.

4. The vegetable knife as recited in claim 3, wherein the pulverizing coring pin includes a blade edge extending around a circumference of the cylindrical tube of the pulverizing coring pin.

5. The vegetable knife as recited in claim 1, wherein the pulverizing coring pin defines a cutting volume at the first end of the pulverizing coring pin.

6. The vegetable knife as recited in claim 5, wherein the plurality of pulverizing tubes extends from the first end of the pulverizing coring pin proximate to the cutting volume to the second end of the pulverizing coring pin opposite the first end.

7. The vegetable knife as recited in claim 1, wherein at least one pulverizing tube of the plurality of pulverizing tubes comprises a plurality of different diameters.

8. The vegetable knife as recited in claim 1, wherein the vegetable knife comprises a conical shape, and the at least one vegetable shaping blade comprises a stepped blade that extends radially outwardly and downwardly from the pulverizing coring pin to the outer flange.

9. The vegetable knife as recited in claim 1, wherein the vegetable knife comprises a plurality of vegetable shaping blades that extend radially outwardly from the pulverizing coring pin to the outer flange.

10. The vegetable knife as recited in claim 9, wherein the plurality of vegetable shaping blades are radially balanced.

11. The vegetable knife as recited in claim 10, wherein the plurality of vegetable shaping blades comprise stepped blades that each extend radially outwardly and downwardly from the pulverizing coring pin to the outer flange.

12. A vegetable knife comprising:
    a pulverizing coring pin for pulverizing a core of a vegetable, the pulverizing coring pin being a tube extending from a first side of the vegetable knife to a second side of the vegetable knife opposite the first side;
    a plurality of pulverizing tubes within the pulverizing coring pin, the plurality of pulverizing tubes extending from a first end of the pulverizing coring pin to a second end of the pulverizing coring pin opposite the first end; and
    at least one vegetable shaping blade extending radially outwardly from the pulverizing coring pin for shaping the vegetable, the at least one vegetable shaping blade for supporting the pulverizing coring pin at a central portion of the vegetable knife.

13. The vegetable knife as recited in claim 12, wherein the vegetable knife comprises a conical shape, and the at least one vegetable shaping blade comprises a stepped blade that extends radially outwardly and downwardly from the pulverizing coring pin to the outer flange.

14. The vegetable knife as recited in claim 12, wherein the vegetable knife comprises a plurality of vegetable shaping blades that extend radially outwardly from the pulverizing coring pin to the outer flange.

15. A vegetable knife comprising:
    a pulverizing coring pin for pulverizing a core of a vegetable, the pulverizing coring pin having an axial extension that extends axially from a first side of the vegetable knife to a second side of the vegetable knife;
    a plurality of pulverizing tubes within the pulverizing coring pin, the plurality of pulverizing tubes extending from a first end of the pulverizing coring pin to a second end of the pulverizing coring pin opposite the first end, the plurality of pulverizing tubes extending in a direction of the axial extension of the pulverizing coring pin with respect to the vegetable knife; and
    at least one vegetable shaping blade extending radially outwardly from the pulverizing coring pin for shaping the vegetable, the at least one vegetable shaping blade for supporting the pulverizing coring pin at a central portion of the vegetable knife.

16. The vegetable knife as recited in claim 15, wherein the pulverizing coring pin defines a cutting volume at the first end of the pulverizing coring pin.

17. The vegetable knife as recited in claim 12, wherein the pulverizing coring pin extends axially from the first side of the vegetable knife to the second side of the vegetable knife, and the plurality of pulverizing tubes extends parallel to the axial extension of the pulverizing coring pin with respect to the vegetable knife.

* * * * *